United States Patent [19]

Duff et al.

[11] 4,082,366

[45] Apr. 4, 1978

[54] FEEDING APPARATUS FOR LIGHTWEIGHT PLASTIC PARTICLES INTO A HIGH PRESSURE REACTOR

[75] Inventors: Clifford C. Duff, Warren; Robert J. Salloum, Sterling Heights, both of Mich.

[73] Assignee: General Motors Corporation, Detroit, Mich.

[21] Appl. No.: 779,161

[22] Filed: Mar. 18, 1977

[51] Int. Cl.² .............................................. B65G 65/32
[52] U.S. Cl. ...................................... 302/11; 302/59; 214/23
[58] Field of Search .................. 214/17 B, 18 N, 23; 243/20; 302/2 R, 62, 11, 59

[56] References Cited

U.S. PATENT DOCUMENTS 4,003,530  1/1977  Davis ..................................... 243/20

FOREIGN PATENT DOCUMENTS 541,820  1/1932  Germany .......................... 214/17 B Primary Examiner—Albert J. Makay
Attorney, Agent, or Firm—George A. Grove

[57] ABSTRACT

Scrap polyurethane foam particles are intermittently fed into a high pressure hydrolysis reactor for recycling by means of a novel feed apparatus mounted on the reactor. The particles are air carried through a controlled inlet valve into the housing of the feed apparatus. The housing is lined with an open ended cylindrical perforated sleeve that retains a charge of particles but permits the air to be exhausted from the housing. An outlet valve is opened and a piston, reciprocative in the sleeve, pushes the particles through the housing outlet into the high pressure reactor. The piston is retracted, the outlet valve closed, and the cycle repeated.

1 Claim, 3 Drawing Figures

FEEDING APPARATUS FOR LIGHTWEIGHT PLASTIC PARTICLES INTO A HIGH PRESSURE REACTOR

This invention relates to feeding lightweight plastic particles into high pressure reactors for recycling. More specifically, the invention relates to an apparatus for intermittently feeding difficult to handle scrap polyurethane foam particles into a continuously operating high pressure steam hydrolysis reactor wherein polyols and diamines are recovered from the scrap.

Plastic scrap foam such as the offal from polyurethane foam automobile seat cushions is normally disposed of as landfill. It is more desirable to dispose of such scrap by breaking it down into recyclable chemicals. However, this generally can be done only in reactors that operate at elevated pressures. Until this invention it was not known how to get low density foam plastic particles into continuously operating high pressure reactors. Hence, the recycling of such foamed plastics has been commercially impractical.

It is an object of this invention to provide an apparatus suitable for feeding foamed plastics into continuously operating high pressure reactors to recover useful chemicals.

It is a further object to provide means for periodically delivering controlled amounts of lightweight plastic particles into reactors operating at pressures significantly different from atmospheric without appreciably varying the pressure of the reactor.

It is a more specific object of the invention to provide a reactor feed apparatus into which successive batches of foam can be introduced by drawing foam particles into the apparatus with a vacuum or blowing them in on a positive pressure air stream and venting the carrier air before the particles are forced into the reactor against the prevailing pressure.

In accordance with a preferred embodiment of the invention, these and other objects are accomplished by providing an apparatus for successively transferring batches of low density plastic particles from a zone of substantially atmospheric pressure into a reactor operated at a pressure substantially above atmospheric pressure. The feed apparatus intermittently delivers the particles into a continuously operating high pressure reactor and valuable chemicals are recovered.

The particles are drawn into a bore in the delivery apparatus by a vacuum applied at a vent therein. The inlet to the bore is equipped with a controlled valve means through which the particles pass into the bore when the valve is open. The vent means from said bore operates synchronically with the inlet valve to draw the carrier air through the housing. The bore is lined with a sleeve provided with holes small enough to keep the plastic particles confined within it but large enough to allow the carrier air to pass through the bore and the vent. The particles collected in the sleeve are isolated from the reactor by a closed valve at the bore outlet.

After the sleeve is sufficiently filled with particles the inlet valve is closed preventing further passage of particles into the sleeve and sealing the inlet. The air vent is also closed and sealed. The outlet valve is then opened and a piston reciprocative in the sleeve pushes the particles through the sleeve past the outlet into the high pressure reactor. The chamber in the housing may be filled with gases exhausted from the reactor which are vented in the next feed cycle. Once in the reactor, the plastic particles begin to hydrolyze. The piston is raised, the outlet valve shut, and the cycle repeated.

These and other objects and advantages of the invention will be more fully understood in view of the detailed description of the invention which follows. Reference will be made to the drawings in which.

In a preferred embodiment of the invention shredded scrap polyurethane foam with a density of about 1 to 3 pounds per cubic foot is delivered into and hydrolyzed in a high pressure steam reactor. For example, the foam may be a blown thermoset polymerization product of toluene diisocyanate (TDI) and a mixture of relatively high molecular weight polyether diols and triols.

Figure 1:
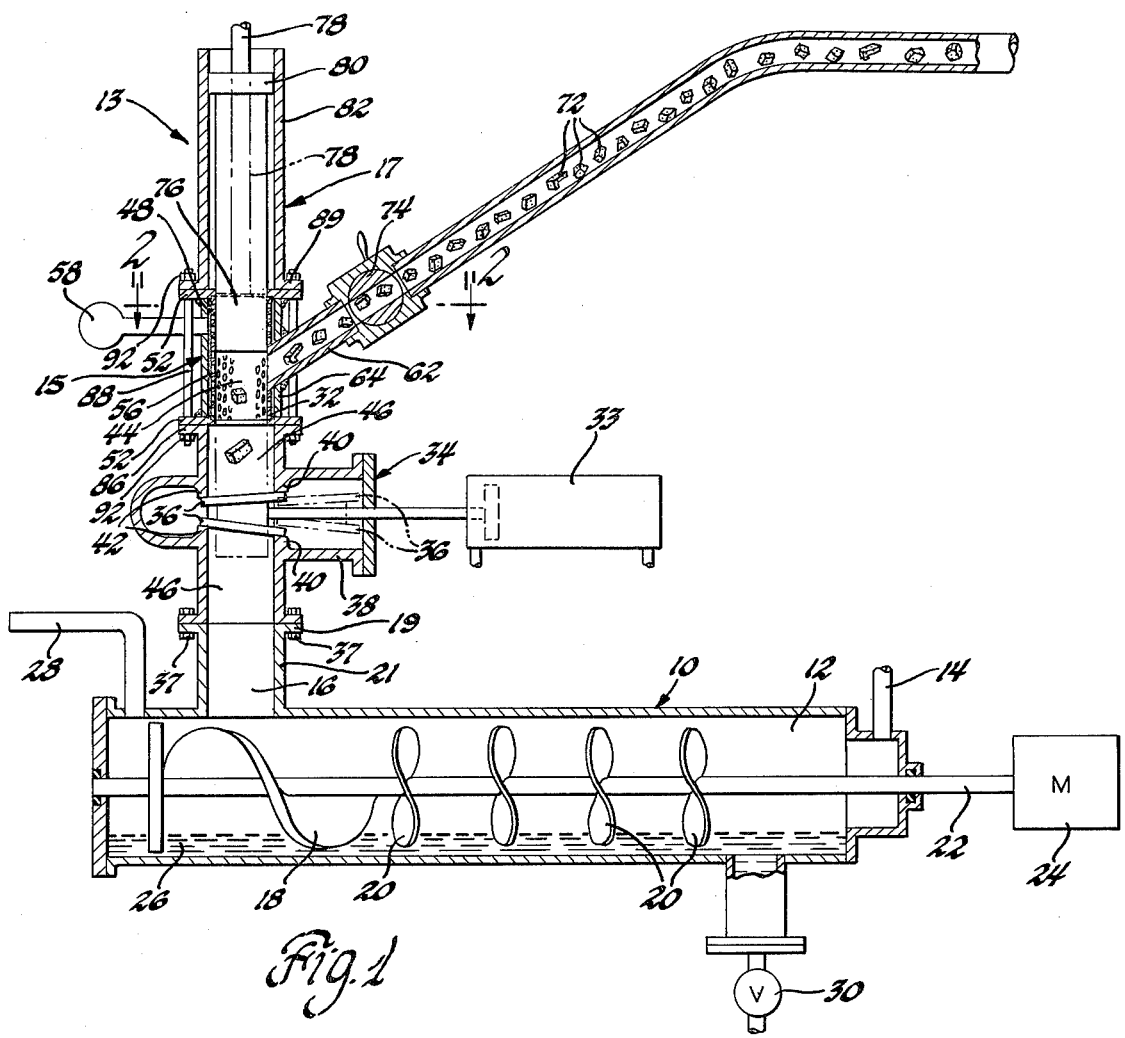
FIG. 1 is a side elevation in section showing the plastic foam feed apparatus in communication with a high pressure hydrolysis reactor. The particle delivery piston is shown in its raised position for particle fill and lowered position for particle delivery by solid and phantom lines respectively.
Figure 2:
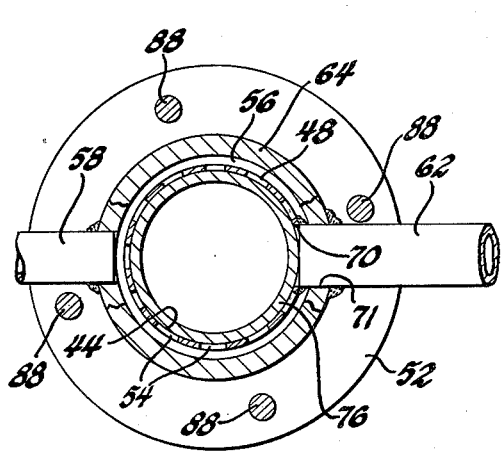
FIG. 2 is a plan section of the feed apparatus housing taken along line 2—2 of FIG. 1 showing inlet, vent portal and inner perforated bore sleeve.

A reactor 10 for hydrolyzing such polyurethane foam is shown in FIG. 1. Superheated steam enters the reaction chamber 12 through steam portal 14. The foam particles are delivered by the feed apparatus 13 as will be described below into the reactor inlet 16. They fall by gravity through the inlet 16 into the horizontally oriented cylindrical reaction chamber 12 and are propelled through chamber 12 by auger 18 and paddles 20 mounted on shaft 22 rotated in a counterclockwise direction by motor 24. They react almost instantly with the superheated steam in the chamber (at a temperature of the order of 600° F. and 150 psig) and are hydrolyzed to liquid polyether glycols 26 which collect at the bottom of the reactor and gaseous diamines which are vented with some superheated steam through reactor outlet vent 28. The diamines can be condensed and converted by chemical treatment such as phosgenation back into TDI. The polyether glycols are drained through outlet valve 30 in essentially reusable form.

As depicted in FIG. 1, in a preferred embodiment the subject apparatus is constructed of a piston assembly 17, a generally cylindrical open ended feed housing assembly 15 and a gate valve assembly 34. These elements are arranged coaxially so that the piston can reciprocate (as will be described) through the housing assembly and the gate valve when it is open. The gate valve seals the reactor when a charge of foam is blown into the housing. When the valve is opened, the piston forces the particles from the housing into the pressurized reactor.

The reactor inlet for the scrap particles 72 is directly beneath feed housing outlet 32 and is separated therefrom by gate valve assembly housing 34 which is bolted to the flange 19 of reactor housing 21 as shown at 37. The gate valve comprises split wedges 36 which in closed position seat at their opposite ends against valve housing 38 at locations 40 and 42 isolating the feed housing assembly 15 from the reactor. The valve is constructed so that the wedges withdraw completely from the bore 46 of the valve 38 in open position as depicted by valve phantom lines in FIG. 1.

Figure 3:
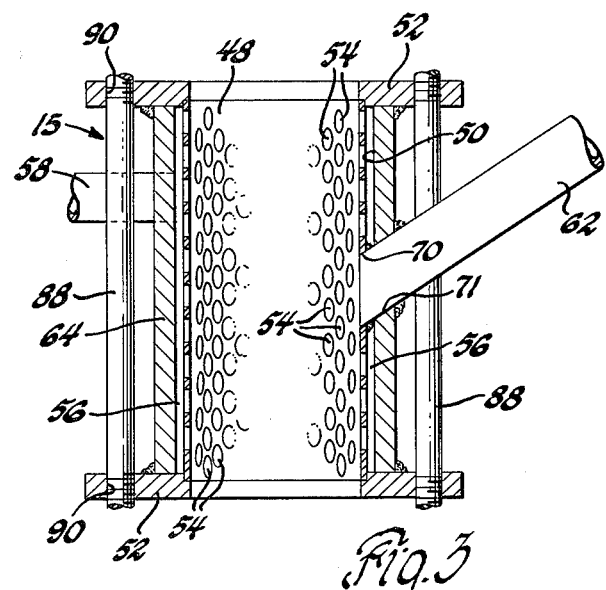
FIG. 3 is an enlarged and more detailed side elevation of the apparatus feed housing shown in FIG. 1.

The feed housing assembly 15 shown in detail in FIGS. 1 and 3 is directly positioned over and bolted to the valve assembly 34. The assembly 15 has a generally cylindrical open ended tubular housing member 64. The housing 64 is lined with a sleeve 48 held in a position spaced apart from the inner housing wall 50 by housing flanges 52. The sleeve 48 is perforated with holes 54 small enough to retain foam particles within it but large enough to allow air to flow into the space 56 between the sleeve 48 and housing wall 50 and out through vent 58. Inlet holes 70 and 71 are provided in the sleeve 48 and housing 64, respectively, to permit entry of airborne foam particles 72 from the particle supply tube 62 into the housing chamber 44 defined by sleeve 48. The flow of the particles 72 into the chamber 44 is regulated by ball valve 74 situated near the housing 64 in supply pipe 62. In open position, the orifice of the valve permits the particles 72 to flow through without restriction. In closed position the valve seals the inlet.

A charge of particles are pushed from the feed apparatus chamber 44 into the reactor 10 by a piston 76 reciprocative in sleeve 48. The piston is operated by push rod 78 slidably sealed in guides 80 of the piston assembly housing 82. The piston can be actuated by suitable means not shown.

The feed apparatus flanges 52 at the ends of the housing are fastened to the piston housing flange 84 and the outlet valve housing flange 86 by coextensive bolts 88 run through guide holes 90 fastened with nuts 92 at either end. The lightweight polyurethane foam particles 72 are pneumatically drawn through supply tube 62 in an air stream from a remote source (not shown) to chamber 44. The valve 74 is opened until the chamber 44 is filled to a suitable level. The valve 74 is then shut sealing the housing assembly from the particle source. The air on which the particles are carried passes through the perforated sleeve 48 in the bore 44 through vent 58 which is regulated by means not shown to be open and vent when valve 74 is open and seal when valve 74 is closed.

The particles 72 empty directly into the sleeve 48 through the opening 70. The inlet pipe 62 may either extend through sleeve 48 or be welded thereto to assure that the particles are retained in the sleeve. The particles are restrained at the outlet 32 of chamber 44 by outlet gate valve 34 as seen in FIG. 1.

To effect delivery of the particles 72 into the reactor, valve 74 and vent 58 are closed, hermetically sealing the feed apparatus housing. Gate valve 34 is opened by pneumatic cylinder means 33, however, the particles in the bore usually do not fall into the pressurized reactor 10 by gravity. This is at least partially attributable to the upward force exerted on the lightweight particles from the pressurized gases expanding into the housing assembly 15 when the valve 36 is opened. Also, static electric charges build up on the particles during delivery causing them to stick to each other and the sleeve 48. Therefore, to effect delivery of the foam particles into the reactor they are pushed by piston 76. The piston 76 fits tightly and is reciprocative in sleeve 48. The piston plunges from a position above the particle inlet 70 as shown in solid lines in FIG. 1 to a position through outlet 32 and past valve wedges 36 as shown in phantom lines in FIG. 1. It has been noted that once the particles have been forced past the open valve they fall freely into the reactor. They are drawn through the reactor by an auger 18 and paddles 20 driven by a motor 24. The piston 76 is then removed to the position above the particle inlet 70 and outlet valve wedges 36 are closed. Another batch of foam may then be introduced into the chamber 44 and the delivery cycle repeated.

Because the space in the sealed feed apparatus housing 15 above the reactor is relatively small, there is no substantial pressure drop in the reactor during the foam delivery. Therefore, the reactor can be continuously operated and does not have to be repressurized after each foam delivery.

The feed section housing, inlet, flanges, and sleeve may be constructed of stainless steel. It is preferable to use noncorrosive metals in these structures to prevent equipment deterioration from the fumes which escape into the feed section from the hydrolysis reactor during the piston feeding operation. The piston of the preferred embodiment was made of a machine steel plated with nickel.

The reactor fumes that escape from the reactor into the feed housing are vented through vent 58 as the next batch of foam is fed into the bore. These fumes can be trapped by suitable means such as a direct contact condenser or charcoal trap to prevent pollution of the surrounding air.

While our invention has been disclosed in terms of specific embodiments, it will be appreciated that other forms could readily be adapted by one skilled in the art. Accordingly, the scope of our invention is to be considered limited only by the following claims.

What is claimed is:

1. Apparatus for intermittently transferring low density plastic foam particles from a zone of substantially atmospheric pressure into a reactor operated continuously at a pressure substantially above atmospheric pressure, comprising:

a cylindrical open ended housing defining an inner chamber, an inlet to said chamber through the wall of said housing for said particles, an outlet at one of said open ends in communication with said reactor, a sleeve retained in said chamber spaced apart from the wall of said housing extending to said outlet from at least said inlet and perforated with holes from said inlet to said outlet, said holes being sized to pass air while retaining said particles, a piston means mounted at the other of said open ends with a piston reciprocative in said sleeve between a first position extending through said outlet and a second position remote from said outlet, said inlet located between said first and second positions, first valve means at said inlet for controlling the admission of said particles through said inlet into said chamber, a closable air vent from said housing synchronized to open with said inlet valve to facilitate the admission of said particles into said chamber by creating a vacuum applied at the air vent, second valve means between said outlet and said reactor movable between open and closed positions, isolating said housing from said reactor in its closed position and permitting the movement of said particles pushed by said piston into said reactor in open position.

* * * * *